US010266743B2

(12) United States Patent
Hernández

(10) Patent No.: US 10,266,743 B2
(45) Date of Patent: Apr. 23, 2019

(54) HIGH-PERFORMANCE AQUEOUS-PHASE POLYMER FLUID FOR DRILLING WELL BORES IN LOW-GRADIENT FORMATIONS

(71) Applicant: TECNOLOGÍA INTEGRAL EN FLUIDOS DE PERFORACIÓN S.A. DE C.V., Camen, Campeche (MX)

(72) Inventor: Carlos Ferrusquia Hernández, Distrito federal (MX)

( * ) Notice: Subject to any disclaimer, the term of this patent is extended or adjusted under 35 U.S.C. 154(b) by 57 days.

(21) Appl. No.: 15/509,452

(22) PCT Filed: Sep. 8, 2015

(86) PCT No.: PCT/MX2015/000124
§ 371 (c)(1),
(2) Date: Mar. 7, 2017

(87) PCT Pub. No.: WO2016/039611
PCT Pub. Date: Mar. 17, 2016

(65) Prior Publication Data
US 2018/0230354 A1    Aug. 16, 2018

(30) Foreign Application Priority Data

Sep. 8, 2014   (MX) ................. MX/A/2014/010736

(51) Int. Cl.
*C09K 8/12*   (2006.01)
(52) U.S. Cl.
CPC ............ *C09K 8/12* (2013.01); *C09K 2208/12* (2013.01); *C09K 2208/32* (2013.01)

(58) Field of Classification Search
CPC ... C09K 8/04; C09K 8/08; C09K 8/10; C09K 8/12; C09K 2208/12; C09K 2208/32
See application file for complete search history.

(56) References Cited

U.S. PATENT DOCUMENTS

2009/0036330 A1* 2/2009 Carbajal ................. C09K 8/12
                                                          507/129
2013/0324443 A1   12/2013 Wang

FOREIGN PATENT DOCUMENTS

MX      2011010227       3/2012
WO   WO 2012008819       1/2012

* cited by examiner

*Primary Examiner* — Aiqun Li
(74) *Attorney, Agent, or Firm* — James R. McDaniel

(57) ABSTRACT

The present invention relates to a high performance aqueous phase polymer fluid, which is a seawater-based drilling fluid for well drilling in low gradient formations. It is formulated based on liquid state polymer chemical products, easy to aggregate, and quickly mixed; a preparation and homogenization that reduces preparation times, designed to drill hydrocarbon-producing deposits, focusing on minimizing damages to the producing formations, with a high rate of circulation loss in naturally-fractured deposits. The system is environmentally-friendly, it complies with the required main functions of the drilling fluids while also providing a high inhibition control by swelling and dispersion of clay zones, due to the polymeric nature of the materials with which it is formulated. It is a fluid that does not contain solids in its formulation and provides an excellent transport and cleaning of the drilling shears in the well.

4 Claims, 10 Drawing Sheets

Estimated loss volume per program
PEMEX m3

REDUCED VOLUME IN THE PRESENT INVENTION

HIGH-PERFORMANCE AQUEOUS-PHASE POLYMER FLUID FOR DRILLING WELL BORES IN LOW-GRADIENT FORMATIONS

TECHNICAL FIELD OF THE INVENTION

The present invention describes aqueous based polymer fluids used in drilling low gradient formations for oil and geothermal wells.

BACKGROUND OF THE INVENTION

During the drilling of hydrocarbon-producing wells, several layers of the Earth's crust are drilled in order to reach the depths where these oil and gas deposits are located; these extracts comprise several geological layers, which have different characteristics as far as rock composition, pressures, and temperatures go. To achieve this purpose, drilling fluids are used. The drilling of wells is performed in both terrestrial and maritime locations and the selection and design of fluids must be carried out so as to avoid problems and operational risks, lower operation costs, shorten drilling time, and increase the production of hydrocarbons.

Formations of dolomitized and fractured carbonates of the Upper Jurassic Kimmieridgian-Thithonian, the carbonate breccia from the Lower Paleocene and Upper Cretaceous, and the carbonated sands of the Lower Eocene are found when drilling is conducted in the Ku Maloob Zapp and Cantarell Production Facilities fields. These types of rocks have a stratigraphic-structural trap. Similarly, the Cantarell, Sihil, EK-Balam, Kuil, Homol, and Onel fields deposits consist of fractured limestones of regular porosity from the Breccia-Paleocene-Upper Cretaceous, at an average depth of 3600-4800 vertical meters, hindering normal drilling during well construction at the breccia stage (BTPKS).

In this field, wells are traditionally built by means of a 36" drill bit using sea water to a drilling depth of up to 210 meters deep (md). Next, a 30" lining pipe (LP) is settled. The next stage uses a 17½" drill bit with a "Bentonite" water-based fluid to 1000 md and a 13⅜" LP is inserted. The next stage is drilled with 12¼" drill bit and inverse emulsion (I.E.) mud with a density of 1.48-2.01 g/cc down to the Upper Paleocene layer (+/−4600 md) and LP is set between 100 to 150 md above the final estimated depth for safety purposes and to avoid loss of total circulation, which would cause a series of operational problems at the beginning of the next stage, such as low rate of penetration (ROP), stuck pipe, etc. Drilling then proceeds using an 8½" drill bit, forming an angle up to 30°, to 4800 md (4700 mv) in the Lower Cretaceous formation. In most cases a low-density (L.D) fluid of 0.92 g/c is used with expected total circulation loss (quantified cases of up to 23,000 $m^3$ lost, diesel-based low-density fluid).

The application of a high-performance aqueous phase polymer fluid formed by the present invention, for the fifth step or the 8½" and 6½" step, due to the nature of the naturally-fractured deposit, is drilled with total circulation loss in maritime locations. To drill in these locations, oil- or water-based fluid systems are currently used, which require expensive logistics and the use of mud vessels to transport extensive amounts of drilling water and diesel. For these wells, drilling operations are conducted pumping drilling fluid during 24 hours, and the water and diesel supplies are totally consumed, causing the interruption of drilling operations and the suspension of operations in platforms more than 80 km offshore due to insufficient water and diesel. The availability of supplies for fluid preparation and maintenance must be considered for the purpose of reducing transport costs and waiting times for the supply of such additives. Due to high operation costs generated daily by total circulation losses during breccia perforation (8½" and 6½" steps), as well as different operational problems, such as pipe entrapment and sticking because of the suspension of shears and clay instability, the selection of appropriate fluid systems for drilling operations is critical and requires a better and innovative design.

For well drilling in the Ku Maloob Zaap and Cantarell fields, the use and application of the high-performance aqueous phase polymer fluid technology were designed with high-performance polymer products, mainly liquid, easy and quick to mix, that guarantee the necessary technical parameters demanded, such as suspension capacity, the carrying of shears to the breccia zone, filtrate control, inhibition of the clay formations such as the lutitic collars of the Upper Jurassic, thermal stability, and resistance to contamination such as anhydrite and $CO_2$, among others that delay the operations caused by the lack of fluid during the total circulation losses.

In the current market, there are companies that apply fluids; for example, the MI Company, which has a system called BAMIL to drill in loss zones, comprised of (3) liquid products and that in its preparation manages to obtain up to 35 seconds of viscosity with a 4:00 hour preparation time for every 70 $m^3$, and inhibition limitations up to 18 CEC. The products have degradation and precipitation on the very low-lubricity liquid Xanthan Gum.

The QMAX Company has a system called QBAM, comprised of 8 chemical products, 5 of which are in powder form and 3 in liquid form, which significantly affects the time it takes for fluid preparation: 4:30 hours for every 70 $m^3$. FIG. 5, presenting clots of polymer in the system and inhibition limitations up to 18 CEC. Additionally, a pre-treatment must be applied to the seawater, increasing the preparation time.

Furthermore, the Global Drilling Fluids Company has a system comprising 8 products, 5 of which are in a powder form and 3 in a liquid form; a pre-treatment has to be applied to the seawater, and during preparation, clots are formed in the fluid, which must be stirred longer preparing in 4:50 minutes for every 70 $m^3$, with inhibition of up to 20 CEC.

In current systems, the presence of Xanthan Gum clots when preparing the fluid directly affects their performance and that of the circulation system, since the clots, also called "fish eyes", may cover the strainers of fluid pumps, drilling tubing, and down-hole drilling motors; therefore, it should be expected that the mix will be finished evenly, thus substantially increasing the fluid preparation times.

Some of the problems that most affect drilling with the use of these systems are the following:
  a) High preparation time, causing an intermittent drilling.
  b) Great volumes of raw materials, causing pending suspension of materials.
  c) Insufficient inhibition in the system causing sticking of pipes.
  d) Use of mud vessels, as support in the preparation and pumping, causing an increase in costs.
  e) Little progress in drilling due to low rheological properties (low viscosity).
  f) Long drilling times.

The fluid of this invention is intended to eliminate the current aforementioned problems, to achieve a reduction in the volumes to be consumed as a consequence of the improvement in the times once the drilling parameters have been improved by providing a very similar lubricity to the oil-based fluids and cleaning of the well, with no need to prepare cleaning sweeps, eliminating the use of supporting vessels for fluid preparation and pumping, and developing a continuous drilling.

Currently, there is no system prepared with so few components and that complies with the speed, preparation, inhibition, and lubricity requirements. Considering that well drilling is an activity more than 60 years old and a system that manages to achieve this activity has not been presented. The stage of the well where these kinds of fluids are usually used is programmed for an average of 20 m per day when 120 m per day are drilled with this system.

One of the objectives of the invention is to provide a fluid to form an aqueous-phase polymer fluid with certain chemical components interacting in a stable way to overcome the current technical problems in well drilling, forming the high-performance aqueous phase polymer fluid of the present invention based on high-performance state of the art polymer chemicals in liquid state, easy to aggregate, quick to mix, with a preparation and homogenization that reduces preparation times. It is designed to drill hydrocarbon-producing deposits, with a focus on minimizing damages to the producing formations, with a high rate of circulation loss in naturally-fractured deposits. The system complies with the main required functions of drilling fluids and also provides a high inhibition control both in swelling and dispersion of the clay zones, due to the polymeric nature of the materials which comprise its composition. It is a non-harmful fluid since its formulation does not contain solids; it provides excellent transportation and cleaning of drilling shears in the well, and it complies globally in environmental matters.

DESCRIPTION OF THE INVENTION

DETAILED DESCRIPTION OF THE INVENTION

Figure 5:
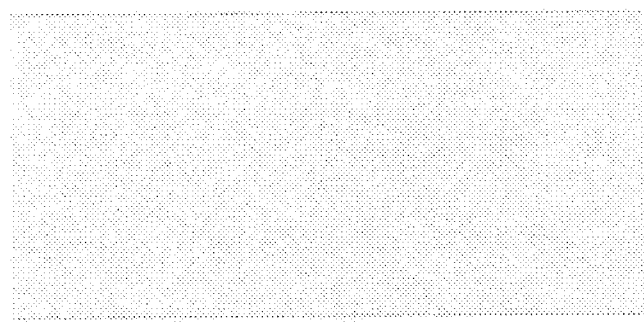
FIG. 5 is a graph representing the generation times in hours, of 70 m$^3$.

As per the presented figures, this invention refers to a high-performance aqueous-phase polymer fluid for drilling wells in low gradient formations, consisting of preparing a significant volume (70 m$^3$) in the shortest time possible with rheological possibilities (Viscosity) as shown in the graph of FIG. 5.

Figure 1:
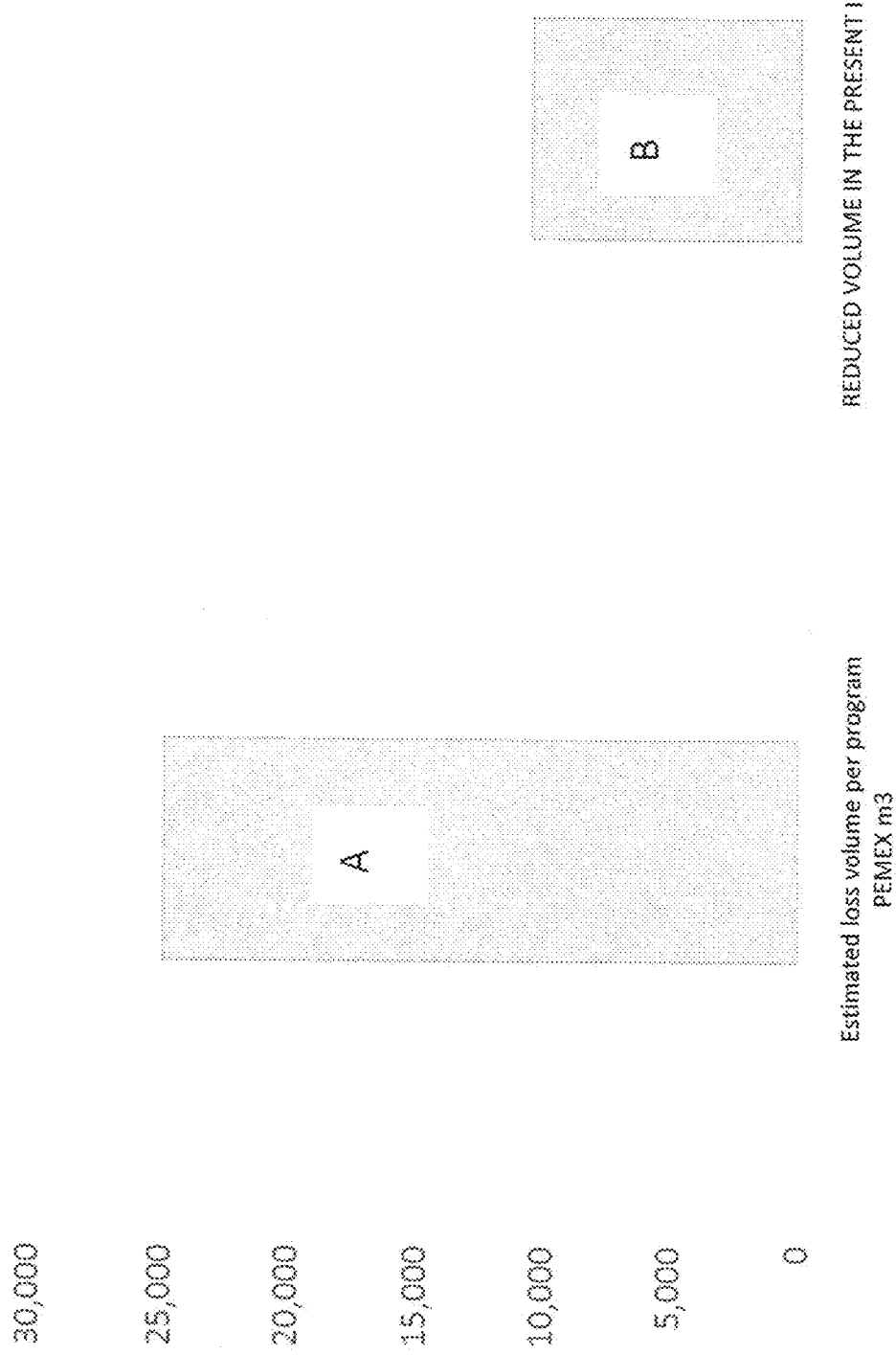
FIG. 1 is a graph representing the reduction of volume loss.

The reason the quantity is 70 m$^3$ or more is because, during drilling operations, 70 m$^3$ to 120 m$^3$ are pumped per hour, depending on the required volumes for drilling; this in order to achieve drilling without having to suspend it due to lack of materials or volume. A test of the reduced volume is shown in FIG. 1.

The elimination of polymer clots also known as "fish eyes" is a priority during the high-performance aqueous-phase polymer fluid preparation, since during formation, one must wait until there is a complete incorporation of the polymer or products to the system in order to avoid pumping equipment damage and blockage of the strainers of directional tools. For this reason, the use of rapid wetting polymers is important in the reduction of preparation times.

When preparing a high-performance aqueous-phase polymer fluid as quickly as in this method, longer stirring times are used often in order to ensure that homogenization and dilution of products has been adequate, and increasing preparation times; therefore, in the process of this invention, a clay inhibitor easily incorporated to the system is used thereby achieving the stirring for 5 minutes at the end of water and last product aggregation (time adjustment to a total of half an hour), to be correctly inhibited.

Figure 7:
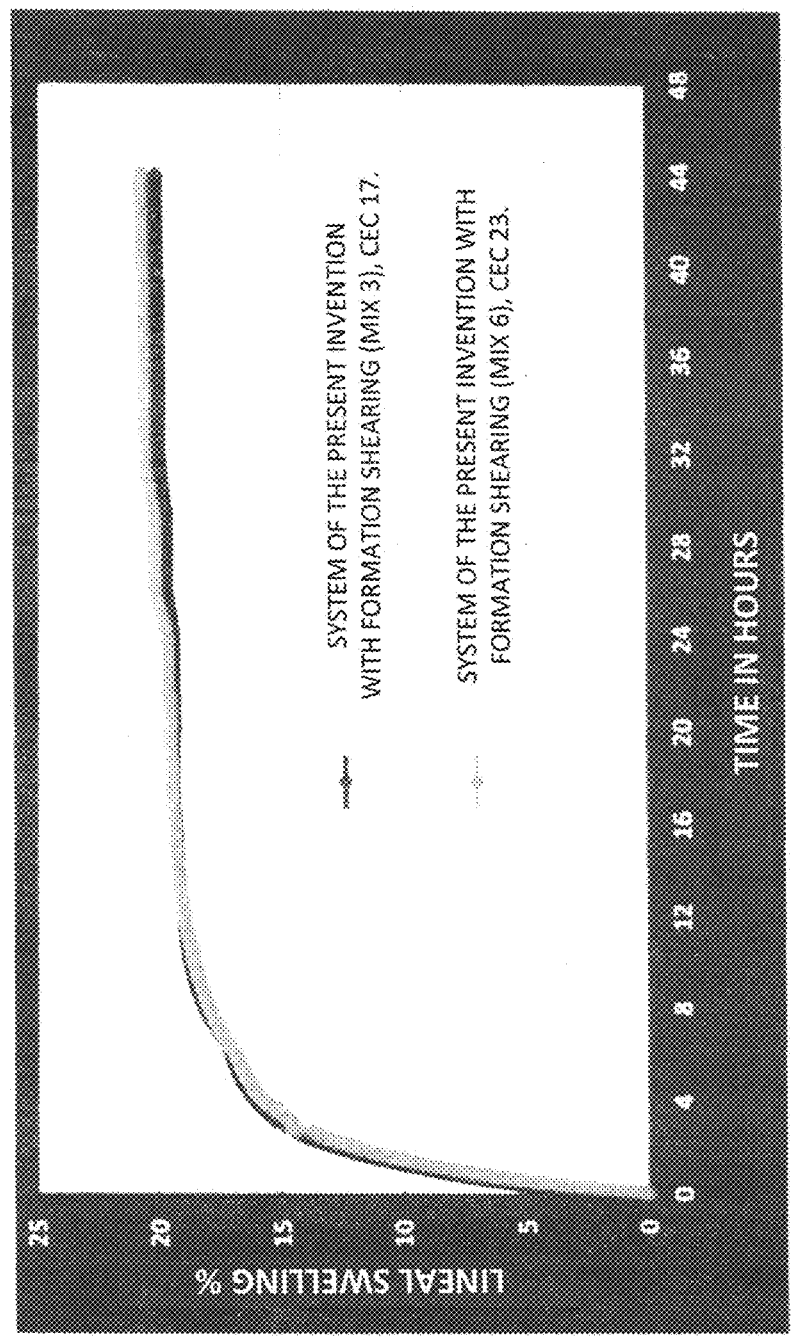
FIG. 7, is a graph that represents the percentage of linear swelling of the high-performance aqueous-phase polymer fluid with formation shears from the Cantarell BTPKS field.

Although all fluids must comply with different regulations of water-based fluids, this fluid is characterized by being manufactured with few materials (five products), that in this case are liquid products and that have been evaluated to have electrochemical affinity when mixing that allows a uniform and quick mixture preparation while also complying with the inhibition, viscosity, lubricity, and rheology requirements, FIG. 7.

During customer validation of drilling fluids, the established requirements in the rock fluid interaction must be complied with, in this interaction the system easily provides clay inhibitions up to 30 CEC, FIG. 7. In addition, unlike other systems, this physicochemical property can be easily given.

The chemical compounds that form the high-performance aqueous-phase polymer fluid for drilling wells in low gradient formations, the function of each compound, as well as the quantities for the mixture are shown below:

| Chemical material | Concentration in L/m$^3$ |
| --- | --- |
| Seawater/continuous phase | 974.80-966.30 |
| Amine corrosion inhibitor | 1.80-2.50 |
| Amine glycol & KCl mixture inhibitor | 5.40-7.20 |
| Xanthan gum (viscosifier) | 8.10-10.80 |
| Polyanionic Cellulose Polymer (filtrating reducer) | 7.20-9.60 |
| Polyacrylamide (clay stabilizer) | 2.70-3.60 |

Figure 2:
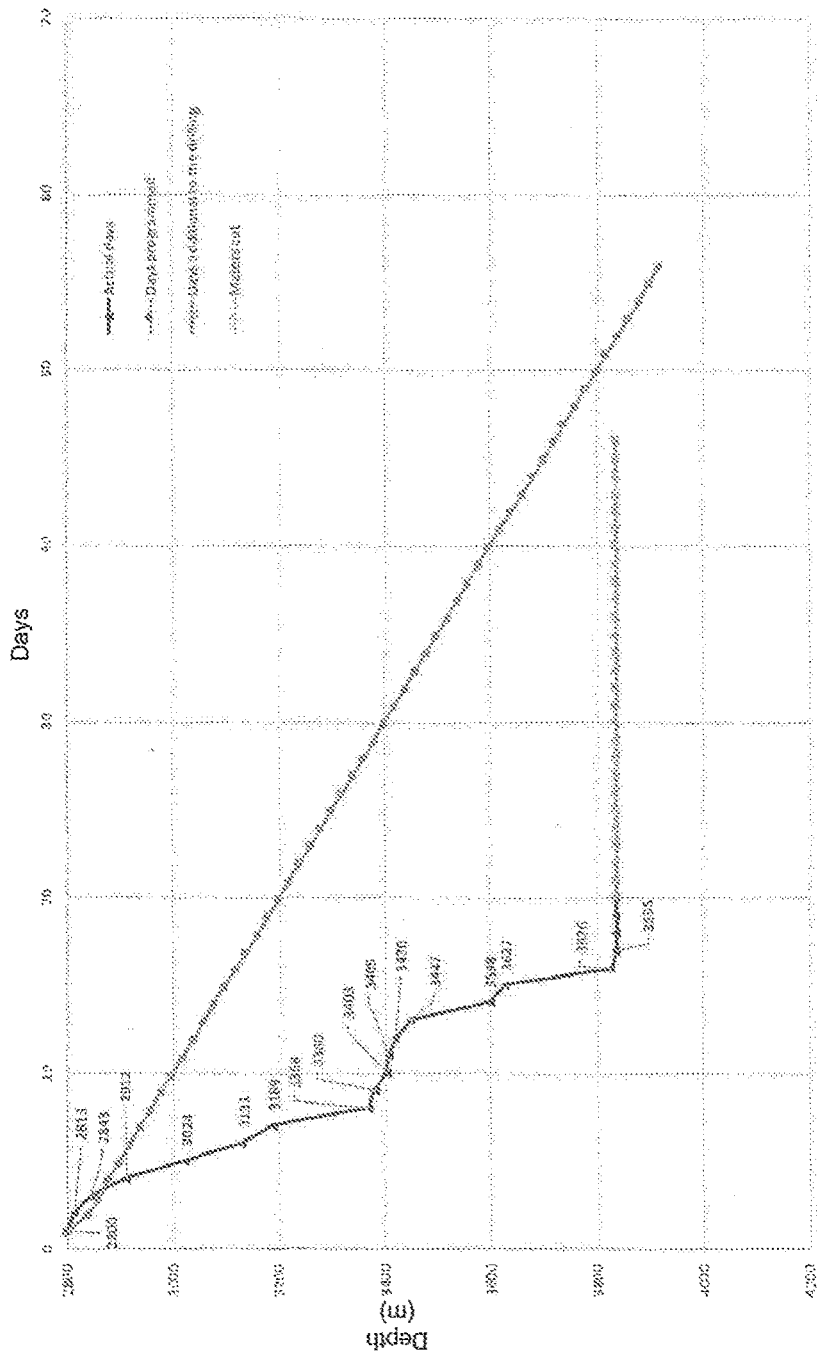
FIG. 2 is a graph representing the reduction in drilling times of the Cantarell 3017 D well.
Figure 3:
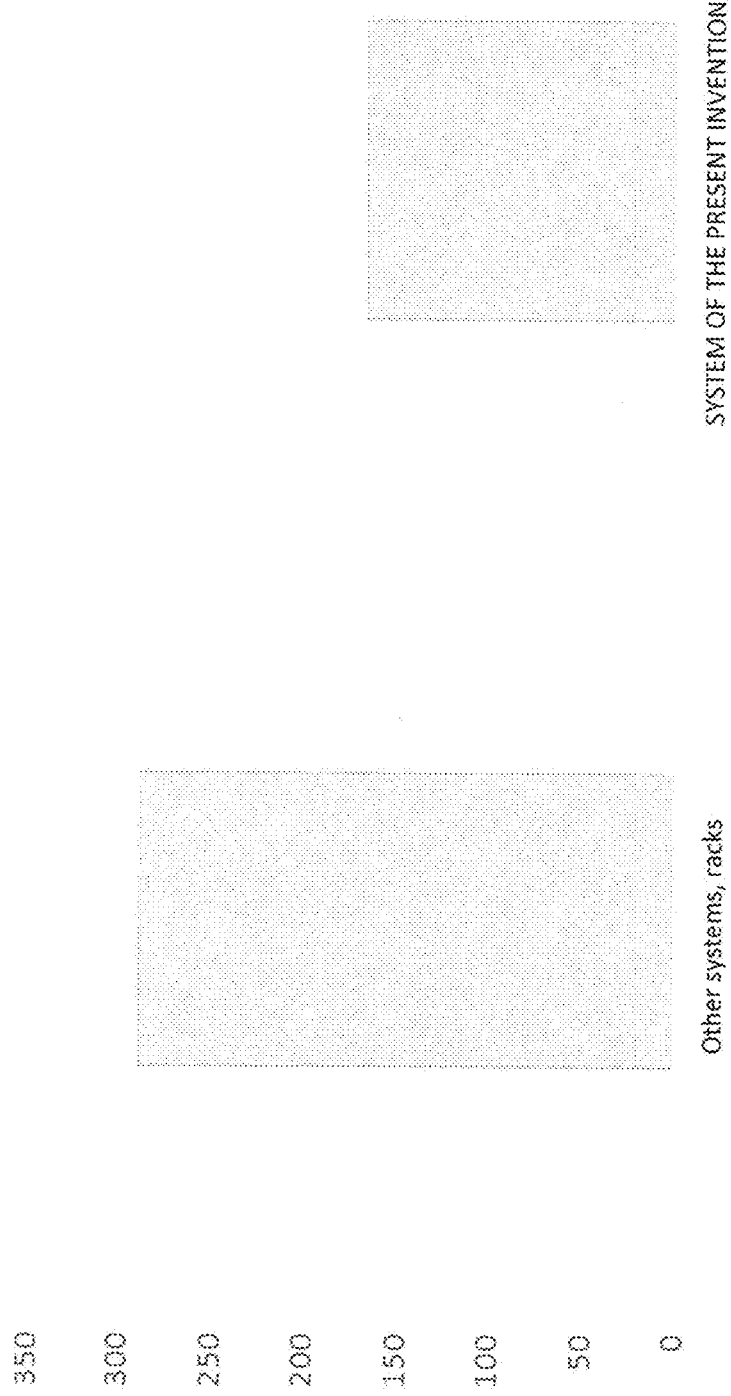
FIG. 3 is a graph representing the reduction of logistics on volume of materials to generate 10,000 m$^3$ (pcs. racks/tote).
Figure 4:
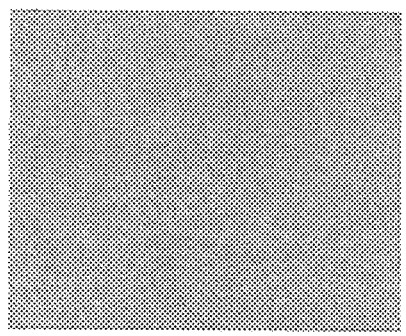
FIG. 4 is a graph representing the pre-treatment of seawater for drilling fluids preparation in hours.
Figure 6:
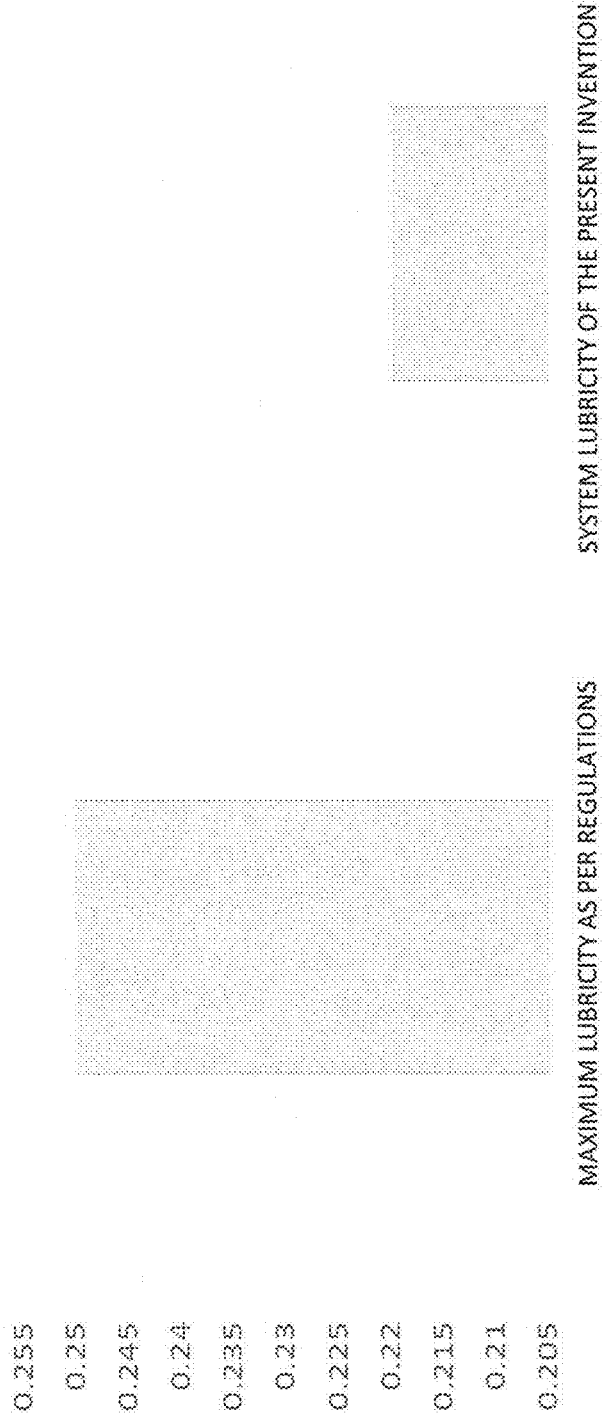
FIG. 6 is a graph representing the lubricity coefficient: Standard NMX-L-167-SCFI-2004.

During the application of this aqueous phase polymer fluid in the Cantarell-3017D well, it was demonstrated that the most important differences and those that make this system unique are the following:

a. The preparation time showed 70 m$^3$ can be manufactured in only 30 minutes as shown in FIG. 5.
    b. Reduction of consumed volume up to 50% regarding the volume consumed with other systems. FIG. 1.
    c. Drilling time improved up to 77%, FIG. 2.
    d. The use of support vessels to prepare and pump fluid was eliminated.

e. The logistics travels of vessels was reduced to 50%, as shown in FIG. 3.
f. The rate of penetration (ROP) was increased due to the high rheological properties. FIG. 2.
g. For the preparation of viscous sweeps of 200 sec., 5 m$^3$ in 5 minutes.
h. The time of pre-treatment to seawater is eliminated, as shown in FIG. 4.
i. Provides 0.22 lubricity, increasing ROP, as illustrated in FIG. 6.
j. Improves the performance of directional motors.
k. Eliminates the generation of wastes in bags.
l. Well finished to gauge.

System Quality Verification, as Per the API RP 13B-1 Method.

The laboratory tests with correlation wells formation samples of the Ku Maloob Zaap and Cantarell fields and the high-performance aqueous-phase polymer fluid formation, are carried out evaluating the following parameters:

Fluid Stability
Fluid density (g/cc).
Marsh viscosity (sec).
API plastic viscosity.
API yield point.
Low-shear rate yield point (LSRYP).
0' gel.
10' gel.
API filtering.
Water and solids content (%).
Chemical analysis (mud alkalinity, pH, filtrate alkalinity, salinity, calcium ions content).
Rock-Fluid Interaction Tests.

In the event that a study on the behavior of the rock-fluid interaction is required, the tests stated in this section will be performed.

Figure 8:
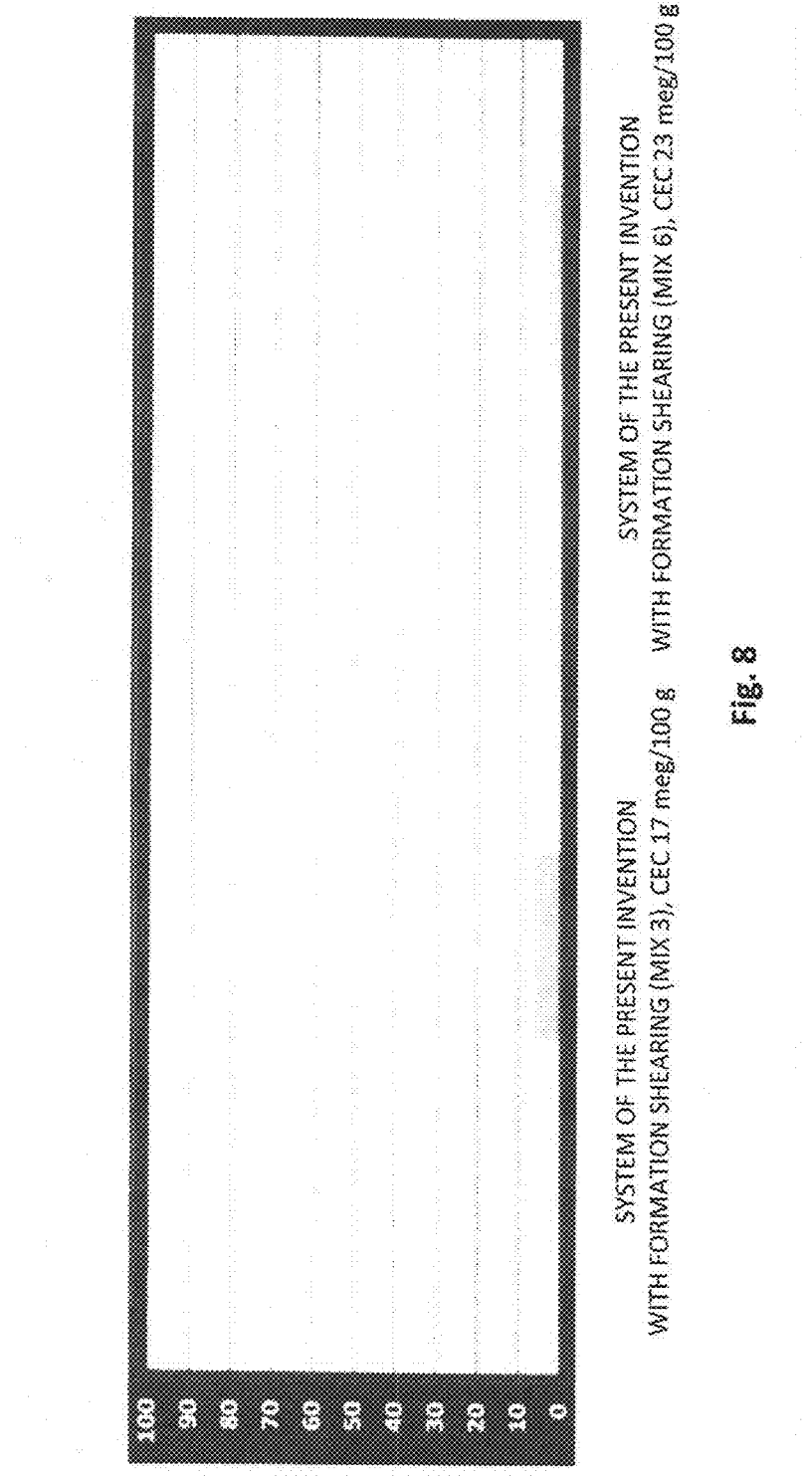
FIG. 8 is a graphic that represents the percentage of formation shear dispersion of the Cantarell BTPKS field.
Figure 9:
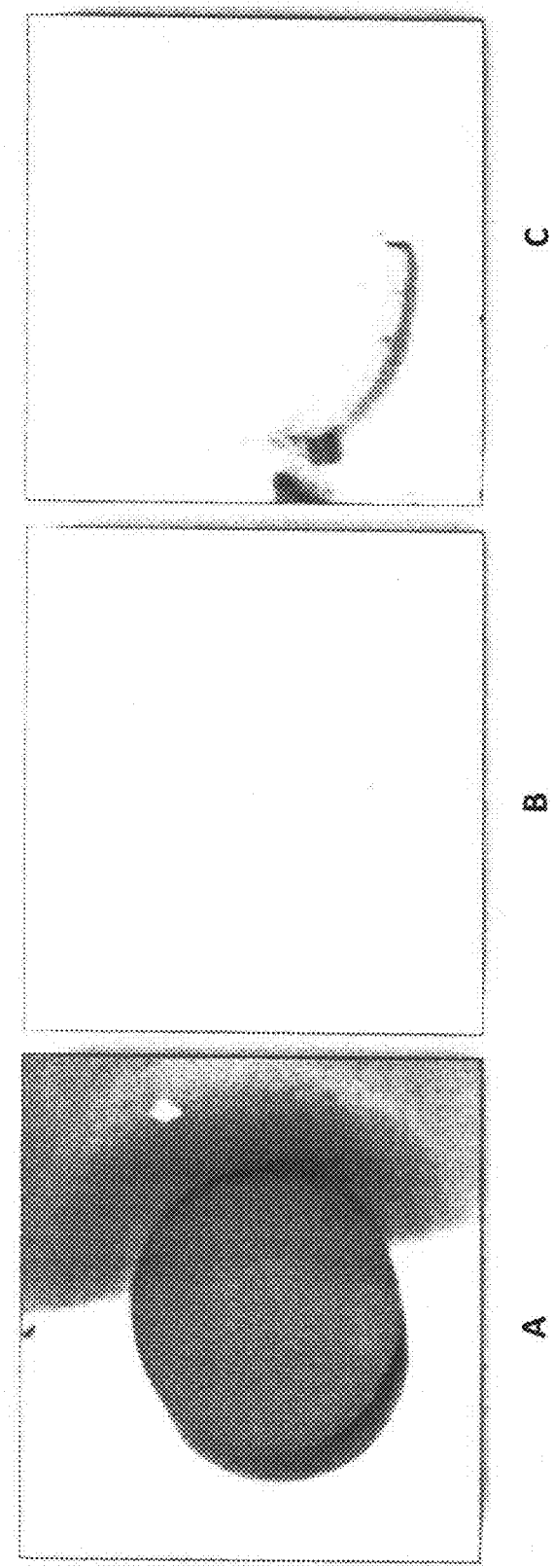
FIG. 9 is an example which illustrates the appearance of the dispersion of the high-performance aqueous-phase polymer fluid of the present invention and the perforation shearing pill, mix 3.
Figure 10:
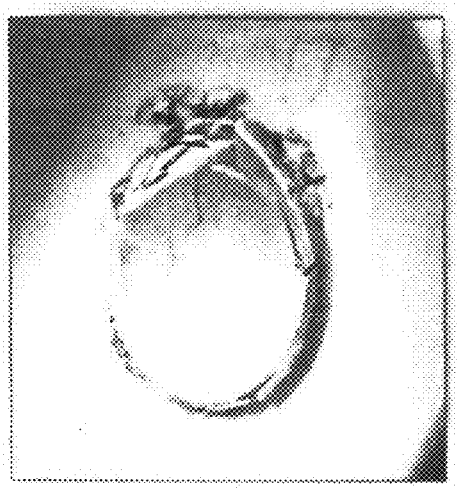
FIG. 10 is an example which illustrates the appearance of the dispersion of the high-performance aqueous-phase polymer fluid obtained by the process of the present invention and the perforation shearing pill, mix 6.
Figure 10:
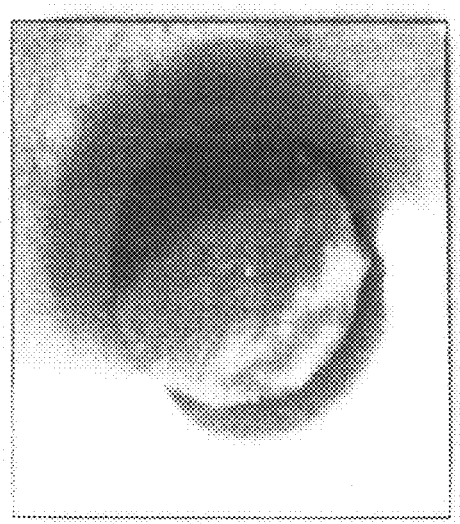
Figure 10:
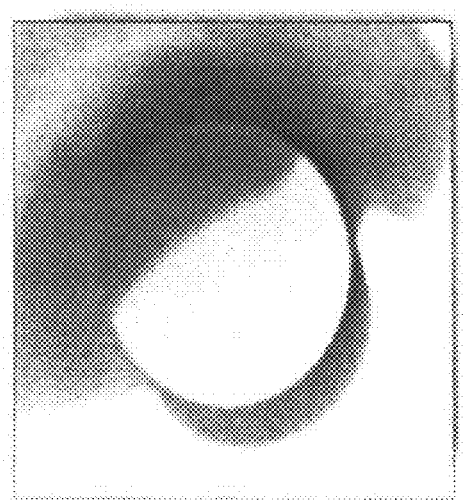

These tests require shearings of formations, cores, or synthetic pills (A-C, A'-C'), of equal formation reactivity. The following interaction tests are performed with the preparation of the high-performance aqueous-phase polymer fluid:

Linear swelling, as shown in FIG. 7.
Dispersion, as shown in FIG. 8.
CEC determination (Cationic Exchange Capacity in meq/100 f of clay sample) of the clays used for the tests, see FIGS. 9 and 10.

Another objective of the present invention is the use of a high-performance aqueous phase polymer fluid in the drilling operation in a subterraneous formation containing hydrocarbons for the fifth step or the 6½" drilling step, due to the nature of the naturally-fractured deposit. Also, the use of a high-performance aqueous phase polymer fluid 1, in a drilling operation in a subterraneous formation containing hydrocarbons for the drilling of the "breccia" area.

Based on the foregoing it can be noted that, even though specific modalities of the invention have been described in this document for illustrating purposes, several modifications can be made without diverting from the essence and scope of the invention. As a result, the invention has no limitations except the ones stated in the attached claims.

What is claimed is:

1. A high-performance aqueous-phase polymer fluid for drilling wells in low-gradient formations, comprising:
    a seawater base;
    an amine corrosion inhibitor;
    a mixture of an amine and a glycol;
    a viscosifier;
    a polyanionic cellulose polymer as a filtrating reducer; and
    a polyacrylamide as a clay stabilizer; characterized in that the seawater base has a 974.80-966 L/m$^3$ concentration; the viscosifier has a 8.10-10.80 L/m$^3$ a concentration; the polyacrylamide has a 2.70-3.60 L/m$^3$ concentration; the polyanonic cellulose polymer has a 7.20-9.60 L/m$^3$ concentration; the amine corrosion inhibitor has a 1.80-2.50 L/m$^3$ concentration; and the mixture of an amine and a glycol has a 5.40-7.20 L/m$^3$ concentration.

2. The high-performance aqueous-phase polymer fluid for drilling wells in low-gradient formations, as claimed in claim 1, characterized by having xanthan gum as the viscosifier.

3. The high-performance aqueous-phase polymer fluid, as claimed in claim 1, wherein the low-gradient formations are further comprised of:
    subterraneous formations containing hydrocarbons.

4. The high-performance aqueous-phase polymer fluid for drilling wells in low-gradient formations, as claimed in claim 1, wherein the low-gradient formations are further comprised of:
    a breccia drilling area having subterraneous formations containing hydrocarbons.

* * * * *